US011415109B2

(12) United States Patent
Ma

(10) Patent No.: US 11,415,109 B2
(45) Date of Patent: Aug. 16, 2022

(54) DAMPER AND LOAD-BEARING ENCLOSURE STRUCTURE HAVING SAME

(71) Applicant: BEIJING GOLDWIND SCIENCE & CREATION WINDPOWER EQUIPMENT CO., LTD., Beijing (CN)

(72) Inventor: Shengjun Ma, Beijing (CN)

(73) Assignee: BEIJING GOLDWIND SCIENCE & CREATION WINDPOWER EQUIPMENT CO., LTD., Beijing (CN)

( * ) Notice: Subject to any disclaimer, the term of this patent is extended or adjusted under 35 U.S.C. 154(b) by 106 days.

(21) Appl. No.: 17/043,221

(22) PCT Filed: Sep. 26, 2018

(86) PCT No.: PCT/CN2018/107458
§ 371 (c)(1),
(2) Date: Sep. 29, 2020

(87) PCT Pub. No.: WO2020/000714
PCT Pub. Date: Jan. 2, 2020

(65) Prior Publication Data
US 2021/0017960 A1 Jan. 21, 2021

(30) Foreign Application Priority Data

Jun. 28, 2018 (CN) .......................... 201810684760.7
Jun. 28, 2018 (CN) .......................... 201810689683.4

(51) Int. Cl.
*F03D 13/20* (2016.01)
*F03D 13/10* (2016.01)
*F03D 80/80* (2016.01)

(52) U.S. Cl.
CPC ............. *F03D 13/20* (2016.05); *F03D 13/10* (2016.05); *F03D 80/88* (2016.05); *F05B 2240/912* (2013.01); *F05B 2260/964* (2013.01)

(58) Field of Classification Search
CPC .......... F03D 13/10; F03D 13/20; F03D 80/88; F05B 2240/964; F05B 2260/912
See application file for complete search history.

(56) References Cited

U.S. PATENT DOCUMENTS

| 4,783,937 A | 11/1988 | Sato |
| 4,922,671 A | 5/1990 | Sato |

(Continued)

FOREIGN PATENT DOCUMENTS

| CN | 87103224 A | 2/1988 |
| CN | 1033208 A | 5/1989 |

(Continued)

OTHER PUBLICATIONS

International Search Report and Written Opinion issued in corresponding PCT Application No. PCT/CN2018/107458, dated Mar. 8, 2019, 10 pages.

(Continued)

*Primary Examiner* — Sean Gugger
(74) *Attorney, Agent, or Firm* — Bayes PLLC

(57) ABSTRACT

A damper and a load-bearing enclosure having the damper are provided. The damper includes a housing forming a containing cavity and a vibration energy dissipation unit located inside the housing, and the containing cavity includes a liquid storage cavity and a mass body movement cavity located at an upper part of the liquid storage cavity; the vibration energy dissipation unit includes a damping liquid contained in the liquid storage cavity and a plurality of mass bodies located inside the mass body movement cavity; and the mass bodies float on the liquid level of the (Continued)

damping liquid, and an outer surface of the mass body is formed with a plurality of toothed projections for breaking waves formed in the damping liquid due to vibration and dispersing the waves in different directions.

20 Claims, 13 Drawing Sheets

(56) References Cited

U.S. PATENT DOCUMENTS

| | | | |
|---|---|---|---|
| 2009/0049767 A1 | 2/2009 | Georgakis | |
| 2019/0219030 A1* | 7/2019 | Munk-Hansen | ........ F16F 9/103 |
| 2019/0249740 A1 | 8/2019 | Wang et al. | |

FOREIGN PATENT DOCUMENTS

| | | |
|---|---|---|
| CN | 1421581 A | 6/2003 |
| CN | 101483184 A | 7/2009 |
| CN | 101994352 A | 3/2011 |
| CN | 102410155 A | 4/2012 |
| CN | 102808882 A | 12/2012 |
| CN | 103785139 A | 5/2014 |
| CN | 204677662 A | 9/2015 |
| CN | 106545102 A | 3/2017 |
| CN | 106703246 A | 5/2017 |
| CN | 106948256 A | 7/2017 |
| CN | 206815164 U | 12/2017 |
| CN | 201396393 Y | 2/2018 |
| CN | 107882690 A | 4/2018 |
| CN | 108797829 A | 11/2018 |
| EP | 0648906 A1 | 4/1995 |
| EP | 1947365 B1 | 6/2012 |
| JP | 2005133670 A | 5/2005 |
| KR | 101842524 B1 | 5/2018 |
| WO | 9618001 A1 | 6/1996 |
| WO | 2016037958 A1 | 3/2016 |

OTHER PUBLICATIONS

Chinese Office Action in corresponding Chinese Application No. 201810684760.7 dated Jul. 30, 2020 (8 pages).
Chinese Office Action in corresponding Chinese Application No. 201810684760 7 dated Sep. 28, 2020 (7 pages).
Chinese Office Action in corresponding Chinese Application No. 201810689683.4 dated Aug. 2, 2019 (7 pages).
Chinese Office Action in corresponding Chinese Application No. 201810689683.4 dated Mar. 29, 2019 (7 pages).
First Examination Report in corresponding Indian Application No. 202017046612 dated Jun. 1, 2021 (7 pages).
European Search Report in corresponding European Application No. 18923771.2 dated Jul. 9, 2021 (8 pages).

* cited by examiner

DAMPER AND LOAD-BEARING ENCLOSURE STRUCTURE HAVING SAME

CROSS-REFERENCE TO RELATED APPLICATIONS

The present application is a National Phase entry of International Application No. PCT/CN2018/107458, filed on Sep. 26, 2018, which claims the priority to Chinese Patent Application Nos. 201810689683.4, filed on Jun. 28, 2018; and 201810684760.7, filed on Jun. 28, 2018. The entire contents of each of the above-identified applications are expressly incorporated herein by reference.

TECHNICAL FIELD

The present application relates to the technical field of wind power generation technology, and in particular to a damper for suppressing vibration of a load-bearing enclosure and a load-bearing enclosure with the damper.

BACKGROUND

Wind turbines are energy conversion devices used for converting wind energy into electrical energy. Generally, a wind power generation equipment includes a load-bearing enclosure (for example, a tower), a nacelle provided on the tower, a generator installed in or outside the nacelle, a wind turbine installed in the wind direction on the head of the nacelle, and the like. For the convenience of machining and transportation, the tower is usually manufactured in sections and then transported to the installation site. At the installation site, multiple sections of the tower are hoisted and assembled in sequence to form a support foundation for the nacelle and generator components, and then the tower is connected to a yaw system at the top of the tower, the nacelle is assembled with the generator, and the generator or gear box is assembled and connected with the wind turbine.

These installation procedures are carried out under the condition that the local wind in the small area environment of the wind farm is unpredictable. During this hoisting and installation process, gusts of varying size or sustained light winds may be encountered. When the wind blows through the tower, the left and right sides of a wake flow generates pairs of antisymmetric vortices which are alternately arranged and rotate in opposite directions, namely Carmen vortex. The vortex leaves the tower at a certain frequency, causing the tower to vibrate transversely in a direction perpendicular to the wind. When the vortex separation frequency is close to the natural frequency of the tower, the tower is apt to resonate and may be destroyed.

FIG. 1A shows an example in which the tower shakes under the action of upwind current. As shown in FIG. 1A, when the wind speed is within a predetermined range, the vortex induced vibration of the tower 10 is caused, and then the tower 10 generates vibrations in the downwind direction (F1) and the crosswind direction (F3, F2).

During the assembly of a wind turbine, the on-site hoisting progress and installation period are apparently restricted by the local wind conditions. Especially when the upper sections of the tower are being installed, the vibration amplitude of the tower increases, the connections between the tower and the yaw position, between the tower and the nacelle, and between the nacelle and the impeller are difficult, and it is impossible to achieve a safe and accurate connection.

During the operation of the wind turbine, the shaking of the tower may also cause damage and hidden dangers to the tower itself and the tower's foundation connections. During the operation of the wind turbine, the tower is not only affected by the gravity generated by the top parts and components and the dynamic load generated by the rotation of the wind wheel, but also affected by natural wind. Vortex street phenomenon generated by wind flowing around the surface of the tower may cause a transverse vibration of the tower which may cause a resonance damage. When the wind blows the impeller to rotate, it may produce alternating bending moment and alternating acting force on the tower. The bending moment and force produced by the downwind direction may become the main reason for the destruction of the tower. In some severe cases, it may cause the tower to break and overturn.

As shown in FIG. 1B, conventional technology uses a spiral line around the tower to suppress the periodic shedding of vortexes on the surface of the tower 10. The spiral wires 20 have different crosswind oscillation suppression effects when they are arranged at different pitches. The upward extension of the spiral wires 20 may destroy the periodicity of the vortex street distribution, which makes the vortex street phenomenon be not easy to generate or makes the vortex street distribution more irregular, breaks the correlation and consistency of the vortex street distribution, and helps to suppress the vortex-induced vibration.

However, the method of winding or fixing the spiral wire on the tower is only used in the hoisting stage, and the characteristic parameters (pitch and height) of the spiral wire have not been optimized, making it difficult to adapt to changes of the wind speed. In order to adapt to the changes of the wind speed or air flow and be suitable for a long-term operation, the manufacturing cost and maintenance cost of spiral wire may increase greatly.

SUMMARY

The present application provides a damper and a load-bearing enclosure with the damper to achieve at least one of the following objectives: providing a damper for suppressing vibration of load-bearing enclosure; providing a damper capable of suppressing vibration of the load-bearing enclosure during hoisting and/or operation of the load-bearing enclosure, and a load-bearing enclosure with the damper; providing a damper which can accelerate the hoisting or installation progress of the load-bearing enclosure, reduce the construction period required for hoisting or installation and improve the hoisting or installation efficiency by suppressing the vibration of the load-bearing enclosure and the load-bearing enclosure with the damper.

According to an aspect of the present application, a damper including a housing forming an accommodating cavity and a vibration energy dissipation unit located in the housing is provided. The accommodating cavity includes a liquid storage cavity and a mass body moving cavity located at an upper part of the liquid storage cavity. The vibration energy dissipation unit includes damping liquid contained in the liquid storage cavity and multiple mass bodies located in the mass body moving cavity. Each of the mass body floats on the liquid surface of the damping liquid, and multiple tooth-shaped protrusions are formed on the outer surface of the mass body.

According to another aspect of the present application, a load-bearing enclosure is provided, and a damper as described above is installed in the load-bearing enclosure. Preferably, a damper fixed or installed inside the load-bearing enclosure is provided.

The above technical solution can not only solve the damage and hidden dangers of the tower foundation connection caused by the swing of the tower of the supporting structure during the hoisting of the wind turbine, but also reduce the risk of overturning the tower in the operation process of the wind turbine. Therefore, according to the above technical solutions of the embodiments of the present application, it is possible to shorten the construction time of the wind farm and improve the reliability during the operation of the wind turbine, which benefits both the wind farm investor and the builder.

BRIEF DESCRIPTION OF THE DRAWINGS

The above and other objects and features of the present application will become clearer through the following description of the embodiments in conjunction with the drawings.

Figure 1A:
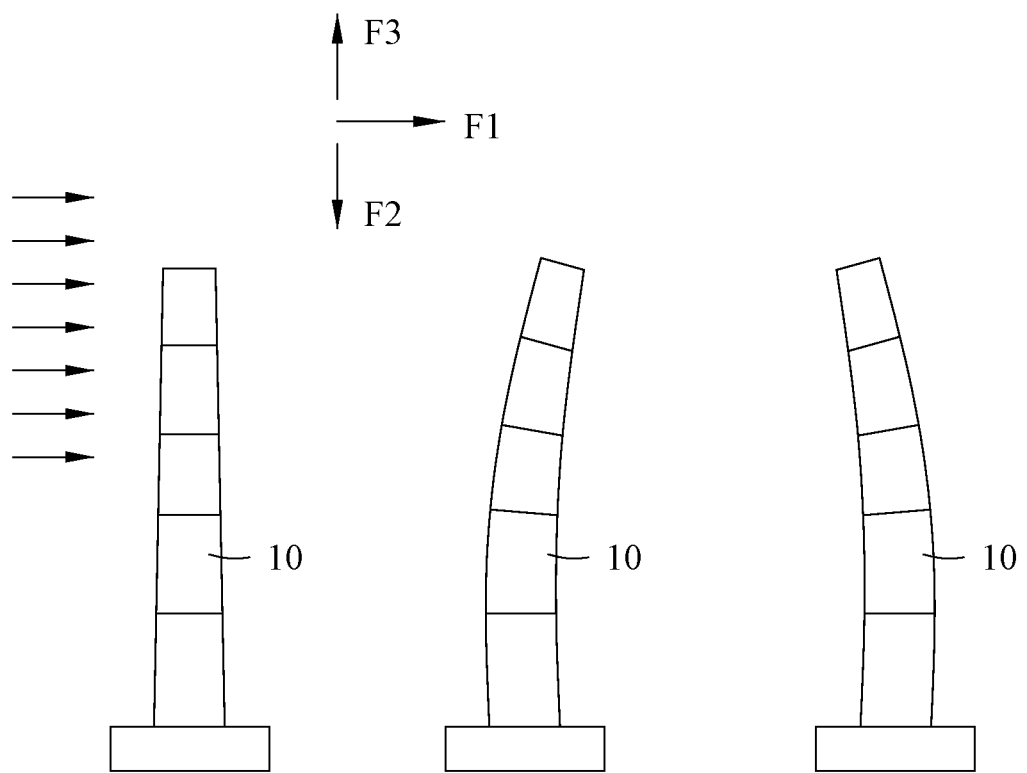
FIG. 1A shows an example in which a tower shakes under the action of an upwind current.
Figure 1B:
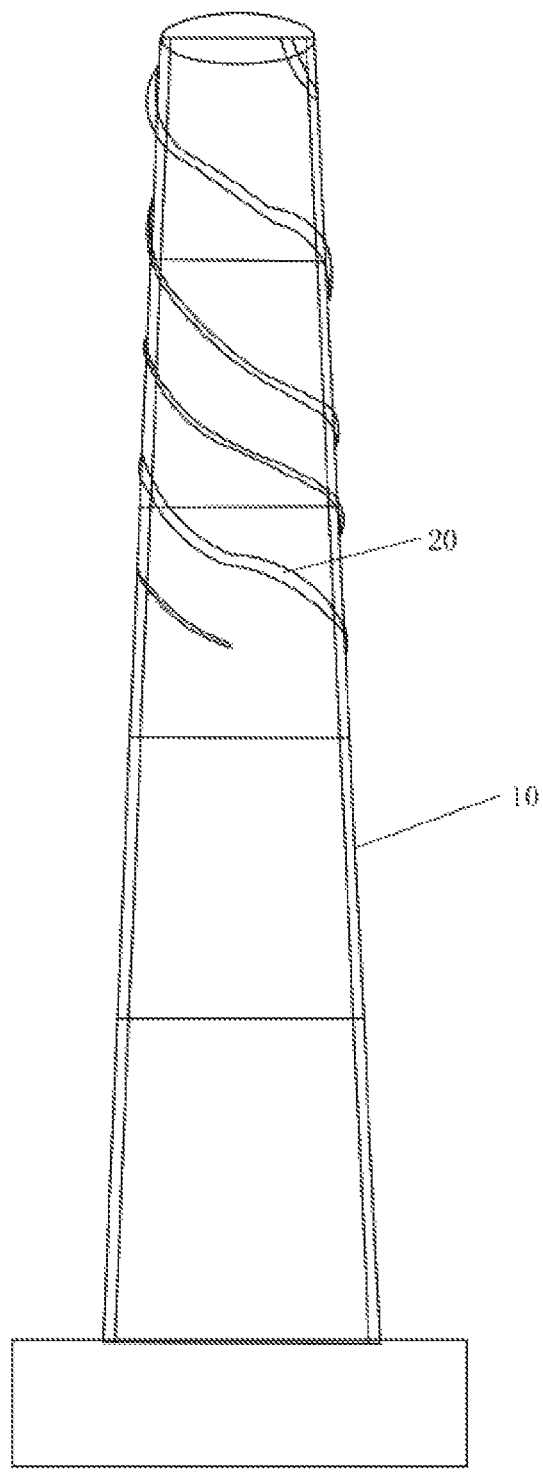
FIG. 1B is a schematic diagram illustrating a tower winding with a spiral wire rope or providing spiral ribs in the prior art.

Reference numerals are as follows:

| | |
|---|---|
| 10 load-bearing enclosure, | 1000, 2000, 3000 damper, |
| 100, 350 housing, | 200, 320 vibration energy dissipation unit, |
| 110 liquid storage cavity, | 101 top cover, |
| 120 mass body movable cavity, | 210 damping liquid, |
| 220 mass body, | 221 tooth-shaped protrusion, |
| 222 restricted passage orifice, | 230 damping coefficient adjusting unit, |
| 231 gas pressure regulating unit, | 240 cavity partition, |
| 224 first magnetic body, | 225 second magnetic body, |
| 227 elastic connecting member, | F1 vibration direction, |
| M1, M2 vibration kinetic energy. | |

DETAILED DESCRIPTION

In order to solve the technical problems in the conventional technology, prevent vortex street phenomenon on the tower and other load-bearing enclosures, prevent excessive vortex-induced response of towers, and suppress tower vibration, a protection system for a wind turbine is provided. Through field investigation and research on that construction of wind farm in high altitude and high mountain areas, the inventor propose a vibration energy dissipation structure built inside a load-bearing enclosure and a load-bearing enclosure having the structure. Hereinafter, embodiments of the present application will be described in detail with reference to the drawings.

Figure 2:
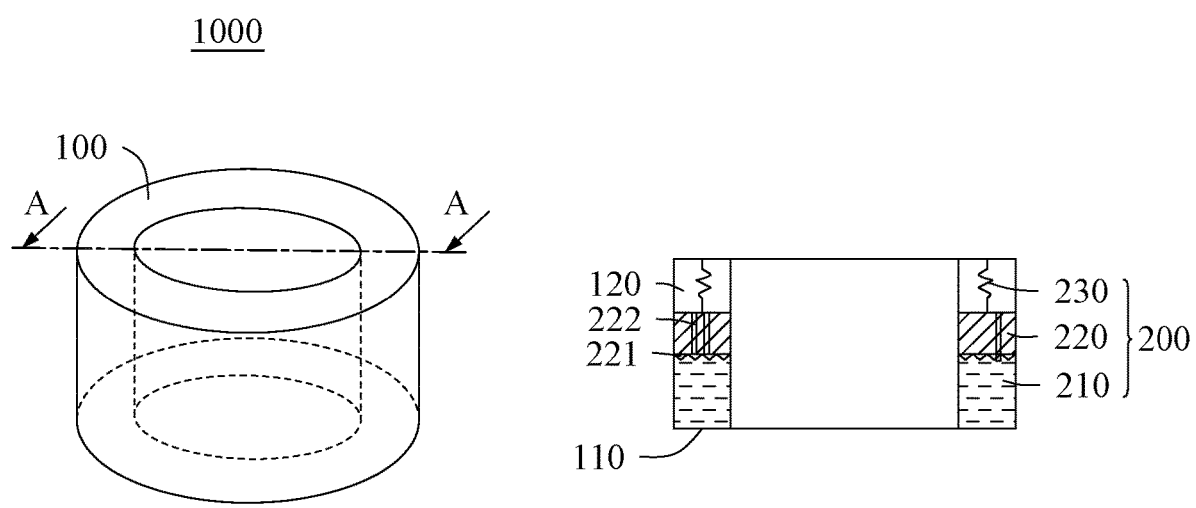
FIG. 2 is a perspective view of a damper according to a first embodiment of the present application.
Figure 3:
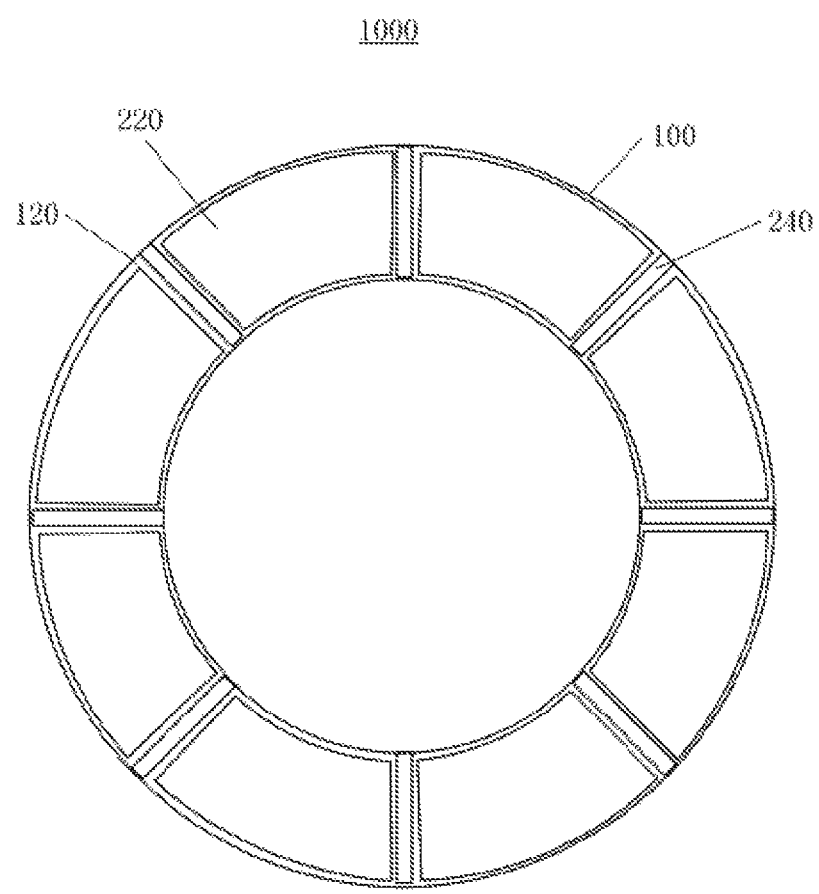
FIG. 3 is a top view of a damper according to the first embodiment of the present application.
Figure 4:
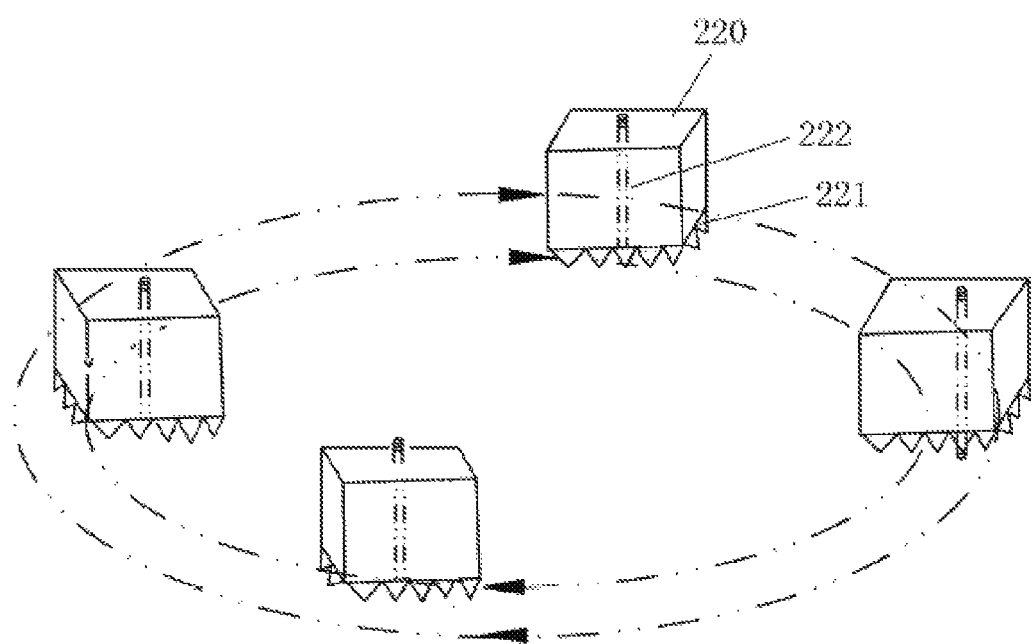
FIG. 4 is a schematic diagram of a three-dimensional structure of a mass body in a damper according to the first embodiment of the present application.
Figure 5:
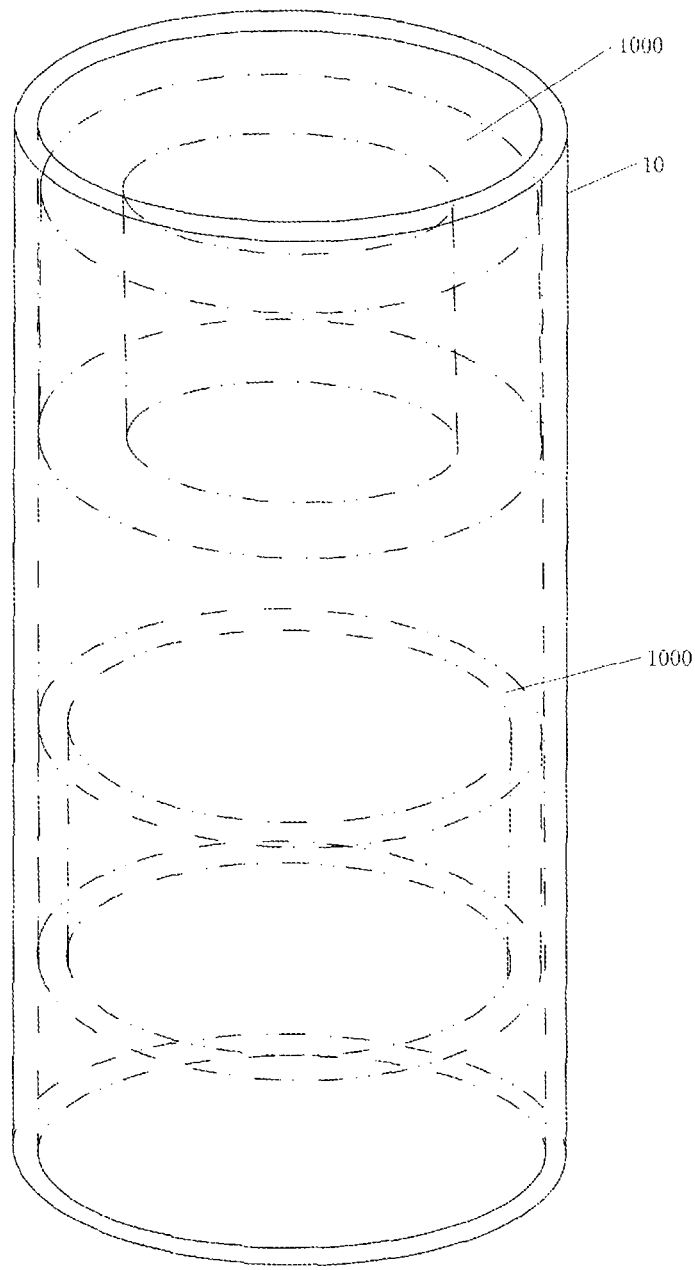
FIG. 5 is a schematic diagram of a load-bearing enclosure providing with the damper according to the first embodiment of the present application.

FIGS. 2 to 4 show schematic diagrams of a damper 1000 according to a first embodiment of the present application. FIG. 5 is a schematic diagram of the damper 1000 according to the first embodiment of the present application set in a tower. FIG. 2 shows a perspective view of the damper 1000 as well as a cross-sectional view of the damper 1000 along a line A-A'.

According to the first embodiment of the present application, the damper 1000 includes a housing 100 forming an accommodating cavity and a vibration energy dissipation unit 200 located in the housing 100.

The accommodating cavity formed by the housing 100 includes a liquid storage cavity 110 and a mass body movable cavity 120 located at the upper part of the liquid storage cavity 110. The energy dissipation unit 200 includes a damping liquid 210 contained in the liquid storage cavity 110 and a mass body 220 located in the mass body movable cavity 120. The mass body 220 floats on the liquid surface of the damping liquid 210.

The damper 1000 according to the first embodiment of the present application may be installed in a load-bearing enclosure (e.g., a tower of a wind turbine, a television tower, a communication tower, a column-shaped factory chimney or cooling tower, a pillar of a bridge, etc.) 10, for preventing the load-bearing enclosure 10 from vibrating too fast or having an amplitude limit in a predetermined wind speed range. When the load-bearing enclosure 10 vibrates, the kinetic energy or momentum carried by the vibration is transferred to the damper 1000 according to the first embodiment of the present application, and the damper 1000 follows the downwind vibration of the tower of the enclosure to generate a corresponding downwind direction vibration. The vibration causes the damping liquid 210 to oscillate and fluctuate in the cavity. The mass body 220 in the damping liquid 210 is affected by the liquid. As the wave moves up and down, the kinetic energy obtained by the liquid transfer is converted into other forms of energy such as gravitational potential energy, heat energy, etc., acting as a damper role, thereby consuming the vibration kinetic energy of the tower of the enclosure, and playing a role in suppressing vibration and reducing vibration of the tower of the enclosure. The energy carried by the downwind vibration of enclosure is transferred to damping liquid and mass body by means of the damping liquid, which is converted into the vertical movement of the damping liquid and mass body and the energy carried in the vertical direction, and is dissipated during the vertical movement. Herein, the energy carried by vibration is transferred and dissipated in orthogonal (or nearly vertical) directions.

In order to dissipate the kinetic energy obtained by the damping liquid and the mass body more effectively, a lower part of the mass body 220 is provided with a wave crushing rake. Multiple tooth-shaped protrusions 221 are formed on the lower surface of the mass body 220, thereby forming the wave crushing rake. Multiple tooth-shaped protrusions 221 formed in the lower part of the mass body 220 may be arranged in order or out of order, arranged in line or cross row. The protrusions 221 may have a same height or may have ups and downs, and there are communicated grooves or slots between the protrusions 221. Each of the protrusions 221 may be formed with a sharp tip or a sharp edge. Line arrangement refers to that the multiple protrusions 221 are arranged in multiple rows or columns, and cross row refers to that the multiple protrusions 221 arranged in a staggered manner. Optionally, the surface of the mass body 220 has been performed an anti-corrosive treatment or it is itself a corrosion-resistant material, and an anti-corrosion layer is formed on the protrusion surface.

The tooth-shaped protrusions on the mass body 220 are arranged in a regular or irregular manner, and are used for generating surface forces in all directions (forces given by the solid surface) on the damping liquid by the sharp tooth-shaped protrusions 221 when the kinetic energy or momentum carried by the ordered damping liquid is always in contact with the lower surface of the mass body (the damping liquid immerses the lower surface of the mass body) and interacts with it, and decompose the fluid contacted by the protrusions 221 into numerous disordered small masses with components in all directions. Specifically, when the damping liquid 210 oscillates due to vibration, the oscillating liquid impacts on the tooth-shaped protrusions 221 of the mass body 220, collides with the tooth-shaped protrusions 221, decomposes the liquid, and is broken and decomposed into small waves in multiple directions. By decomposing large waves into small anisotropic waves, the crisscross grooves between the protrusions 221 on the lower surface of the mass body 220 cause the large kinetic energy or large momentum carried by the liquid in one direction to be decomposed into small kinetic energy or momentum in different directions, and then the small kinetic energy or momentum in different directions collide with each other again, weaken or cancel out, thus the total kinetic energy obtained and carried by the liquid with directional coordination is reduced in value. The vector sum of the shunt momentum after the liquid is divided by the protrusion and its groove is greatly reduced, and the liquid flowing in contact with the protrusion produces a shunt flow in different directions and a surface force in the vertical direction, and the surface force in a horizontal direction in all 360 degrees, thus consuming the vibration energy transmitted by the enclosure in the manner of decomposing the liquid and shunting the liquid momentum, and preventing the vibration of the load-bearing enclosure 10 from exceeding the predetermined amplitude.

As shown in FIG. 3, the damper 1000 may be cylindrical, and multiple mass body moving cavities 120 may be provided along the circumferential direction, and a corresponding mass body 220 is provided in each mass body movable cavity 120. The mass body movable cavity 120 may be separated by a cavity partition 240. The cavity partition 240 is disposed along the height direction of the damper 1000 to make the mass body 220 move in the vertical direction. The height of the cavity partition 240 is not strictly limited, as long as it can provide a guiding function for limiting the mass body 220 and moving the mass body 220 up and down. Optionally, multiple damping liquids at the lower parts of the mass bodies 220 communicate with each other.

The mass body movable cavity 120 and the mass body 220 may have a fan-shaped cross section, and the number of the mass body movable cavity 120 and the mass body 220 may be an even number. The fan shape may be a pointed fan shape or a blunt fan shape (i.e., fan ring shape). As an alternative embodiment, in the example shown in the drawings, the mass body movable cavity 120 and the mass body 220 are shown in the shape of a blunt fan. In this case, the accommodating cavity formed by the housing 100 may be an annular cylindrical structure. The housing 100 may include an outer cylinder wall, an inner cylinder wall, a top cover, and a bottom wall.

According to an embodiment of the present application, when the damping fluid oscillates, the mass body 220 may move up and down with the wave, thereby converting vibration energy into frictional heat energy and dissipating it. In addition, when the liquid level in one side or one direction in the cavity increases and the liquid level in the other side or one direction passing through the center of the horizontal circular section decreases, the kinetic energy in the horizontal direction is converted into the kinetic energy in the vertical direction. As the liquid level rises and falls, the mass body 220 moves up and down. During the upward and downward movement of the mass body 220 carrying kinetic energy or momentum, the mass body 220 rubs against the liquid, the liquid rubs against the chamber wall, and the liquid rubs against the chamber wall in various ways of damping energy consumption to turn (convert to vertical direction) and dissipate vibration energy. At the same time, the moving liquid does work and consumes power during the upward movement of the mass body 220, thereby reducing the amplitude of the downwind and lateral vibration processes of the load-bearing enclosure.

As shown in FIG. 2, the damping 1000 according to the first embodiment of the present application may further include a damping coefficient adjusting unit 230 for adjusting the damping coefficient of the vibration energy dissipation unit 200. The damping coefficient adjusting unit 230 may be disposed on the upper part of the mass body 220. When the mass body 220 moves upward, a downward force is applied to the mass body 220, and when the mass body 220 moves downward, an upward force is applied to the mass body 220.

In the first embodiment according to the present application, the damping coefficient adjusting unit 230 may be an elastic member with an adjustable rigidity, for example, a spring member with an adjustable rigidity. The damping coefficient adjusting unit 230 is provided on the upper portion of the mass body 220 and applies an elastic force to the mass body 220. Specifically, the elastic member may be provided between the upper surface of the mass body 220 and the top cover of the housing 100.

The damping coefficient of the damper 1000 may be adjusted by adjusting the elastic coefficient of the elastic member, so that the damper 1000 is suitable for different load-bearing enclosures, or the damping coefficient of the damper 1000 may be adjusted according to the vibration parameters of the load-bearing enclosures, for example, according to the external wind speed and/or the lateral vibration amplitude of the tower.

As shown in FIG. 2, a restricted passage orifice 222 may also be formed in the mass body 220, and the restricted passage orifice 222 passes through the mass body 220 along the height direction. Part of the damping liquid 210 may move from the lower part of the mass body 220 to the upper part of the mass body 220 along the restricted passage orifice 222, and then flow into the liquid storage cavity 110 along the outer surface of the mass body 220 or another fluid channel, thereby adjusting the vibration amplitude of the mass body 220 and acting as a differential controller. More specifically, the gas at the upper part of the mass body 220 is communicated with the liquid at the lower part through the restricted passage orifice 222, so as to adjust the pressure difference between the upper and lower surfaces of the mass body 220 and inhibit the sudden change of the pressure difference between the upper and lower surfaces of the mass body 220, thereby inhibiting the rapid movement of the mass body 220 and preventing the vibration amplitude of the mass body 220 from exceeding the limit, hitting the top of the cavity and getting out of control. On each mass body 220, there may be multiple restricted passage orifices 222 distributed at different positions.

The restricted passage orifice 222 may be an equal cross-section orifice or a variable cross-section orifice, and may be a circular orifice or a polygonal orifice. The restricted passage orifice 222 may be formed by forming an orifice in the mass body 220 and then inserting a hollow cylinder into the orifice. Optionally, the lower end of the restricted passage orifice 222 extends into the damping liquid 210 to a predetermined depth to ensure that the lower end inlet is in communication with the liquid, and the upper end of the restricted passage orifice is higher than the predetermined height of the upper surface of the mass body 220 to prevent the liquid on the upper surface of the mass body 220 from flowing back into the restricted passage orifice 222 and blocking the restricted passage orifice 222.

According to the damper 1000 of the embodiment of the present application, the shock absorption function of the load-bearing enclosure is realized by disordering the ordered vibration energy. The dissipated vibration energy is finally converted into heat and other forms of energy. Therefore, a heat dissipation structure, such as a heat dissipation fin or an external radiator, may also be provided on the housing 100. In order to dissipate heat quickly, a cooling fan may also be provided for accelerating the air convection coefficient on the surface of the cooling structure. When the outer wall of the housing 100 is fixedly installed with the load-bearing enclosure, the heat dissipation structure may be provided on the inner cylinder wall of the damper 1000.

In addition, in order to avoid the damping liquid 210 becoming sticky or even freezing in winter when the temperature is low, which may otherwise result in a failure of the damping function of the damper 1000, a heater, a temperature sensor, and other components may also be provided in the liquid storage cavity 110 (not shown). When the temperature in the damping liquid 210 is lower than the predetermined temperature, the heater is activated.

As shown in FIG. 5, the damper 1000 according to the first embodiment of the present application may be installed on the inner wall of the tower 10 of the wind turbine, and may be fixedly connected to the tower 10 through the outer wall of the damper 1000. When the tower 10 vibrates due to the air flow, the vibration is transmitted to the damper 1000 according to the embodiment of the present application. The vibration energy is absorbed and dissipated by the vibration of the damping liquid 210, the mass body 220 and the elastic member.

Figure 6:
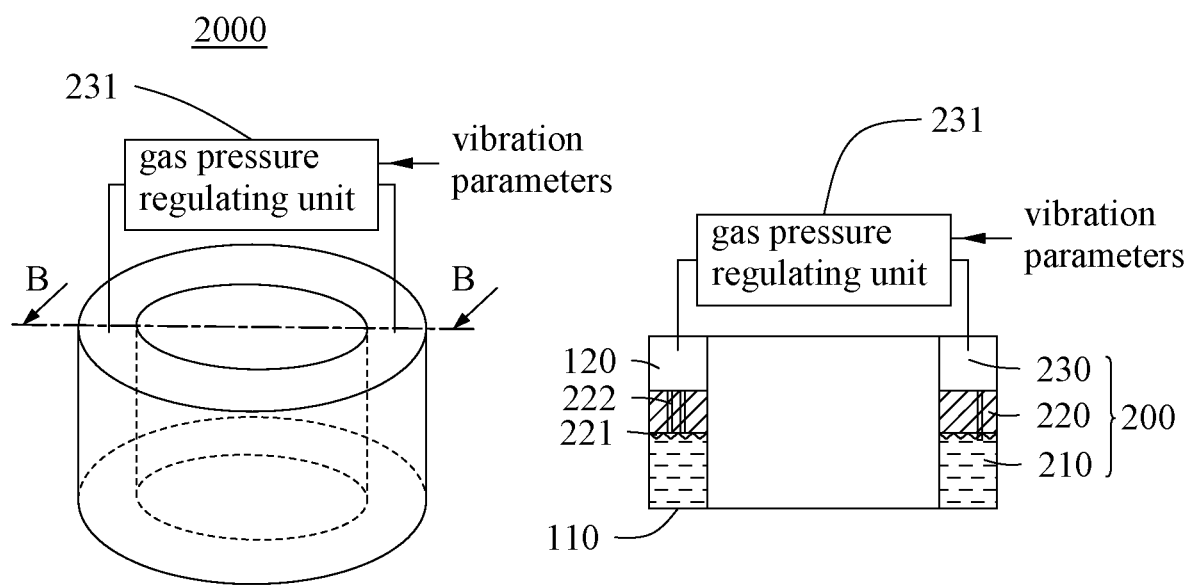
FIG. 6 is a perspective view of a damper according to a second embodiment of the present application.
Figure 7:
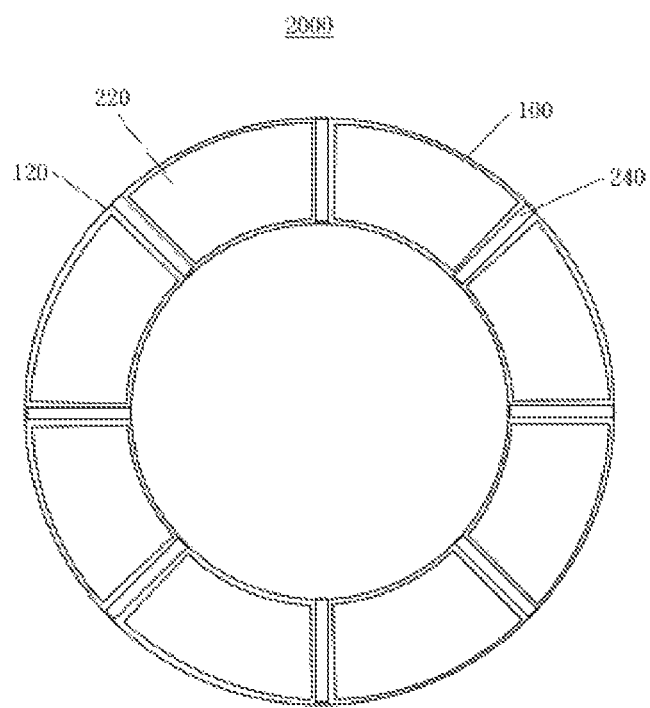
FIG. 7 is a top view of the damper according to the second embodiment of the present application.

FIG. 6 shows a perspective view of a damper 2000 as well as a cross-sectional view of the damper 2000 along a line B-B' according to a second embodiment of the present application. FIG. 7 shows a top view of the damper 2000 according to the second embodiment of the present application. The damper 2000 according to the second embodiment of the present application includes a housing 100 and a vibration energy dissipation unit 200. Except for the structure of the damping coefficient adjusting unit 230, the structure of the damper 2000 according to the second embodiment of the present application is basically the same as that of the damper 2000 according to the first embodiment of the present application. Therefore, only the structure of the damping coefficient adjusting unit 230 will be described in detail below.

According to the second embodiment of the present application, the damping coefficient of the damper 2000 is adjusted by filling the upper space of the mass body 220 with gas and adjusting the pressure of the gas. When the sealing requirements are met, the upper space of the mass body 220 may be directly filled with gas. In addition, a flexible airbag may be provided in the upper space of the mass body 220, an air inlet and an air outlet are provided on the flexible airbag, and the pressure in the flexible airbag is controlled by the gas pressure regulating unit 231.

Therefore, according to the second embodiment of the present application, the damping coefficient adjusting unit 230 further includes the gas pressure regulating unit 231. For example, it includes a compressor and its controller, a pressure measuring sensor, an intake valve, an exhaust valve, etc. The gas pressure regulating unit 231 adjusts the damping coefficient of the damper 2000 by changing the pressure of the gas charged in the upper space of the mass body 220 according to the wind speed, the tower vibration acceleration, the amplitude parameter of the tower shaking, and the like.

The gas in the upper space of the mass body 220 is a fluid damping, and the liquid immersed in the lower part of the mass body 220 is also a fluid damping, that is, when the mass body 220 moves in the gas or liquid, damping is generated by the fluid medium. The fluid damping force is always opposite to the moving speed of the mass body 220. When the gas pressure is small, the downward resistance generated by the gas to the mass body 220 and the damping liquid in the later stage of upward movement is small, and the blocking effect is slow, and the gas space is easily compressed in a short time. The gas absorbs the kinetic energy (ordered energy and high-quality energy) of the upward movement of the mass body 220 and the damping liquid during the rapid compression process, and the compressed energy of the gas is converted into disordered energy (heat energy and low-quality energy) during the compression process. The greater the mechanical energy obtained by the mass body 220 and the damping liquid for upward movement is, and the lower downward resistance in a fast change is, the faster speed the mass body and the damping liquid obtain, and the formed liquid damping force is always opposite to the moving speed of the liquid, and the magnitude is always proportional to the square of the speed. The same is true for the friction damping between the mass body 220 and damping liquid, and between the mass body 220 and the chamber wall. The effect of the gas pressure on the damping mass body 220 and the liquid reaching the top is to prevent the mass body 220 from hitting the top of the housing. The gas pressure may accelerate the downward return movement of the mass body 220 and the liquid. The higher the gas pressure is, the faster the start-up stage returns, which helps the mass body 220 and the damping liquid return. After the information obtained by the pressure sensor is processed by the controller, the pressure adjusting measures are taken for the gas: accelerating the up-and-down movement speed of the liquid and the mass body 220, accelerating the conversion and dissipation rate, thus the damper 2000 can adaptively control the gas pressure in the chamber or air bag according to the vibration state of the enclosure (large or small vibration acceleration and vibration displacement values), so as to accelerate the energy dissipation rate and suppress the vibration acceleration and vibration displacement of the enclosure.

In the damper 2000 according to the second embodiment of the present application, gas may be charged into the mass body movable cavity 120 after being pressurized, and the gas can be used as an energy storage element to form a damping and energy dissipation mechanism in combination together with the movement of the mass body 220.

In the second embodiment according to the present application, the mass body 220 may also be provided with a restricted passage orifice 222. The restricted passage orifice 222 acts as a differential controller, and suppresses the amplitude of the reciprocating vibration of the mass body 220.

Similarly, the damper 2000 according to the second embodiment of the present application may be installed on a load-bearing enclosure, for example, on the inner wall of a tower of a wind turbine, for absorbing and dissipating the vibration kinetic energy of the tower. In the process of hoisting the wind turbine, if the tower is hoisted and the nacelle installation conditions are not met, the tower may be protected. In addition, the damping coefficient of the damper may be adaptively adjusted according to the change of the wind direction and wind force in the hoisting process or the operation process of the wind turbine, so as to achieve the best damping performance.

Figure 8:
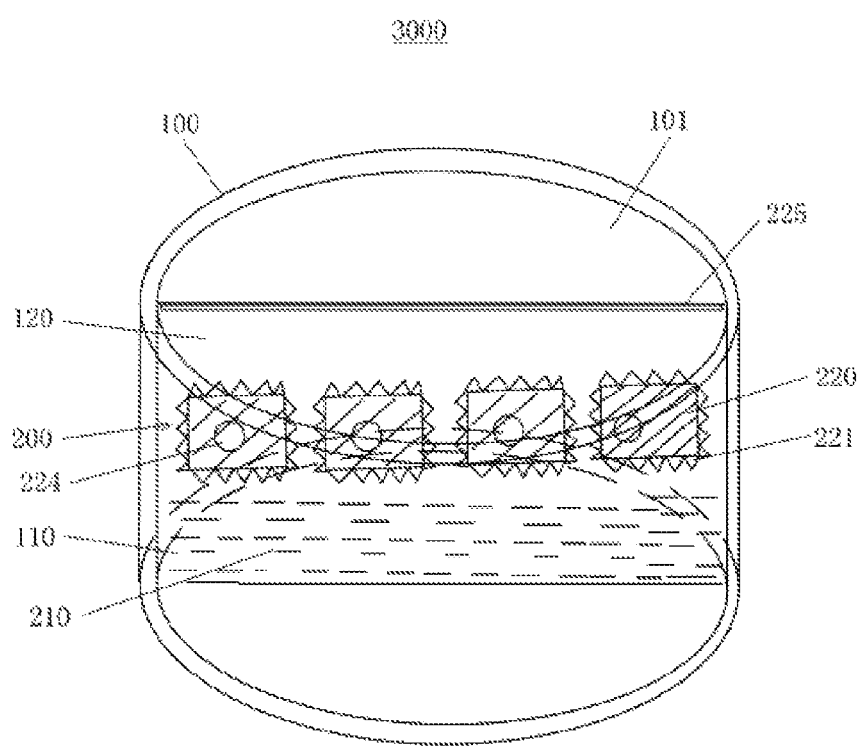
FIG. 8 is a perspective view of a damper according to a third embodiment of the present application.

FIG. 8 shows a damper 3000 according to a third embodiment of the present application. As shown in FIG. 8, the damper 3000 according to the third embodiment of the present application includes a housing 100 and a vibration energy dissipation unit 200 located in the housing 100.

In the third embodiment of the present application, the housing 100 includes an outer cylindrical wall, a top cover 101 and a bottom wall, forming a cylindrical accommodation cavity. Optionally, the housing is of a cylindrical structure, and the vibration energy dissipation unit 200 is disposed in the cylindrical accommodation cavity, and includes a damping liquid 210 and multiple mass bodies 220 floating on the damping liquid 210.

Different from the damper in the previous embodiment, multiple mass bodies 220 float freely on the liquid surface of the damping liquid 210, and no partition plate is provided between adjacent mass bodies 220. The wave crushing rake may be formed on the outer peripheral surface of the mass body 220, and optionally, is may be formed on the entire outer peripheral surface of the mass body 220. The wave crushing rake is multiple tooth-shaped protrusions 221 formed on the outer surface of the mass body 220. Multiple tooth-shaped protrusions 221 formed on the outer surface of the mass body 220 may be arranged in order or in a cross row, the protrusions 221 may have a same height or have ups and downs, grooves or slots which are criss-crossed and communicated with each other may be formed between the protrusions 221, and a sharp tips or a sharp edge may be formed on each of the protrusions 221. Optionally, the surface of the mass body 220 has been performed an anti-corrosive treatment or it is itself a corrosion-resistant material, and an anti-corrosion layer is formed on the protrusion surface.

When multiple mass bodies 220 float in the damping liquid, a criss-crossed staggered structure is formed between the wave crushing rakes of adjacent mass bodies 220 by means of the protrusions 221, and a gap always exists between adjacent mass bodies 220, thus the damping liquid cannot continuously flow in a specific direction in the gap, forming a gap for dynamically dissipating energy.

According to an embodiment of the present application, the tooth-shaped protrusions 221 on the mass body 220 are arranged crosswise, and when the load-bearing enclosure vibrates, the orderly and directionally fluctuating damping liquid always contacts and interacts with the outer surface of the mass body 220 carrying kinetic energy or momentum. The wave crushing rake generates surface forces on damping liquid in all directions by means of the sharp tooth-shaped protrusions 221, and decomposes the fluid in contact with the protrusions 221 into the kinetic energy or momentum of numerous disordered small masses with components in all directions. Specifically, when the damping liquid 210 oscillates due to vibration, the oscillated liquid impacts on the tooth-shaped protrusions 221 of the mass body 220 and collides with the tooth-shaped protrusions 221, thus it is broken and decomposed into small waves in multiple directions. Meanwhile, the crisscross grooves between the protrusions 221 on the outer surface of the mass body 220 make the large kinetic energy or momentum carried by the liquid in one direction be decomposed into small kinetic energy or momentum in different directions, and then the small kinetic energy or momentum in different directions collide with each other, weaken or cancel each other, thus the total kinetic energy obtained and carried by the liquid with consistent directionality is reduced numerically, and the vector of component momentum after the liquid is diverted by the protrusions and their grooves is greatly reduced. Therefore, multiple mass bodies 220 can generate different directions of split flows, vertical surface force and horizontal 360-degree surface force on the liquid contacting the protrusion 221, thus consuming the vibration energy transmitted by the enclosure by means of dissolving the liquid and splitting the liquid momentum, and preventing the vibration of the load-bearing enclosure 10 from exceeding a predetermined amplitude. Meanwhile, due to the collision between the wave crushing rakes, the energy in the contact and collision process is extremely non-conservative and decays rapidly, which facilitates the disorderly decomposition of vibration energy.

Figure 9:
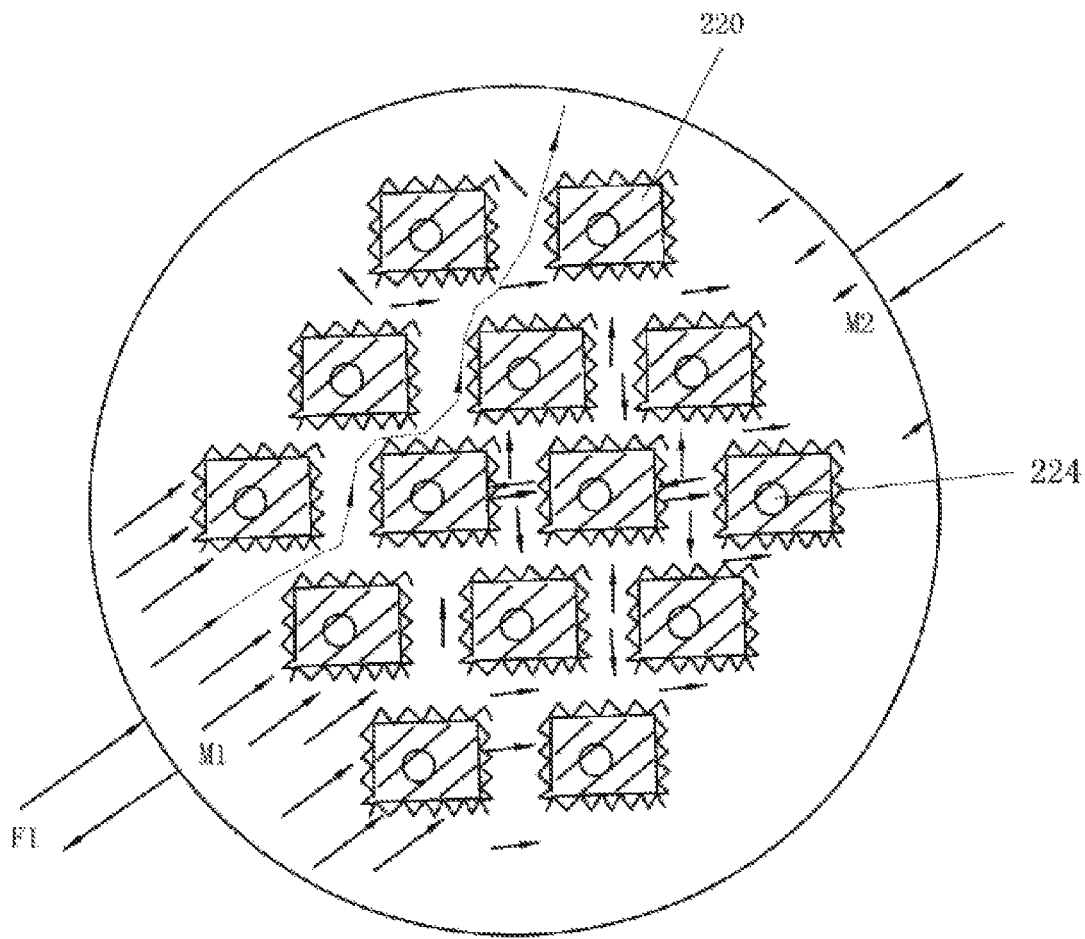
FIG. 9 is a top view of an example of a damper according to the third embodiment of the present application, in which the cross section of the mass body is rectangular.
Figure 10:
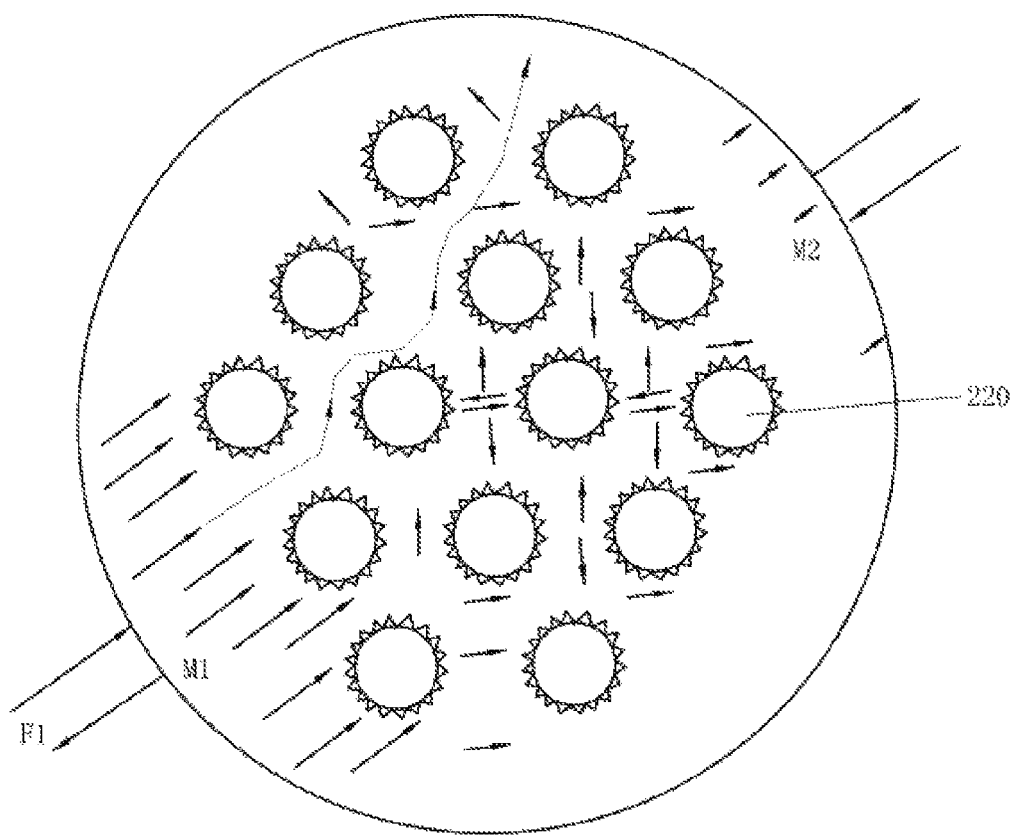
FIG. 10 is a top view of another example of a damper according to the third embodiment of the present application, in which the cross section of the mass body is circular.

As shown in FIG. 9, when the damper 3000 is excited to generate downwind (longitudinal) or crosswind vibration by the vibration energy transmission of the enclosure, the side that firstly receives the vibration kinetic energy (the left side in FIG. 9) transfers the kinetic energy from the fixed boundary of the damper 3000 to the damping liquid 210, and the damping liquid that firstly receives the vibration kinetic energy at this boundary shakes and fluctuates along the vibration direction transmitted to the liquid at the initial stage. In order to understand the transmission and dissipation process of vibration kinetic energy more intuitively, the distribution of vibration energy of damping liquid and the direction of vibration energy caused by vibration energy in the damping liquid are illustrated by the distribution density of arrows in damper 3000 and the orientation of arrows.

Herein, M1 represents the vibration kinetic energy or momentum firstly received by the damping fluid, and M2 represents the kinetic energy or momentum that passes through the vibration energy dissipation unit 200 and continues to be transmitted to the confined solid boundary along the original vibration direction F1. In FIG. 9, after receiving the transferred kinetic energy, the damping fluid on the left side of the damper fluctuates to a large extent, and the vibration kinetic energy M1 or momentum value of the damping fluid is large, and the fluctuation direction is determined, which is basically consistent with the vibration direction. When the damping fluid carries vibrational kinetic energy or momentum and collides with the mass body 220 and flows through the gap between the adjacent mass body 220, the damping fluid collides with the wave crushing rake and is scattered and broken in different directions, thus, the damping fluid in the direction of fluid momentum is decomposed into small (liquid micelle) kinetic energy or momentum in multiple different directions. The kinetic energy or momentum is constantly consumed in the process of passing through the energy dissipation gap. When it reaches the opposite side, the kinetic energy or momentum is almost exhausted. Only a small amount of liquid carries the vibration kinetic energy or momentum along the original shaking direction. Therefore, after the vibration energy M2 passes through the cross section of the damper, the remaining vibration kinetic energy or momentum M1 has been greatly reduced or weakened.

Therefore, when the damper 3000 according to a third embodiment of the present application is installed in the load-bearing enclosure, the dynamic energy dissipation gap of the damper 3000 may adjust the direction of the liquid momentum carrying the vibration kinetic energy of the enclosure, which may cause large waves break into anisotropic small waves, thus, the initial vibration energy transmitted to the damping liquid is scattered and decomposed, and the ordered and directional vibration energy is disordered, thereby achieving the vibration suppression.

As shown in FIG. 9, the side walls of the mass bodies 220 may be formed as magnetic walls, and the adjacent or non-adjacent wall surfaces of multiple mass bodies 220 have the same magnetic polarity, and are simultaneously magnetic N poles or magnetic S poles. Therefore, a non-contact repulsive force is formed between the magnetic walls of the same polarity. The repulsive force enables a gap to be always formed between the two surfaces, facing each other, of adjacent mass bodies 220, or a natural separation after collision. The damping formed by two adjacent mass bodies 220 due to the repulsive force of the same magnetic polarity prevents the crossing of fluctuating liquid, prevents liquid sloshing, inhibits the fluctuation of liquid level, prevents the crossing of damping liquid fluctuation energy and its transmission to the opposite solid wall in the direction of 180 degrees, reduces the transmission rate, and attenuates the fluctuation intensity of liquid level. The damping is inversely proportional to the gap distance and directly proportional to the magnetic field strength. The formed damping inhibits the fluctuation rate of the mass body 220 (makes the fluctuation of the mass body 220 be smooth), inhibits the mass body 220 from floating up and down, and consumes the energy carried by the liquid fluctuation process. The movement between magnetic rakes of the same polarity is always anisotropic, and is always in a suppression state, which breaks the periodicity and inertia of the reciprocating motion of waves, breaks the correlation between waves and waves, and breaks the inertia correlation between waves and rakes.

Therefore, when the liquid vibrates, flows and waves along the annular structure in the annular cavity, the gap between the adjacent mass bodies 220 can form a shuttle channel for the fluctuating liquid to shuttle between the surfaces of the two mass bodies 220 up and down, back and forth, left and right, and is broken in the shuttle process, thus breaking, decomposing and disordering the vibration momentum obtained by the liquid. After crushing, the liquid is dispersed in various directions, and the total momentum (the momentum synthesized after crushing) becomes smaller and smaller, and eventually dissipates.

The mass body 220 may be formed with a magnetic wall surface in many ways. For example, a magnetic material may be coated on the surface of the mass body 220, or a layer of magnetic material may be coated or adhered on the outer surface of the material forming the mass body 220, and magnets may be provided on the side wall of the mass body 220, thus the first magnetic body 224 is provided on the mass body 220 to make the wall surface of the mass body 220 be magnetic.

As shown in FIG. 8, the first magnetic body 224 is provided on the side surface of the mass body 220, and the magnetic properties of the first magnetic body 224 provided on different mass bodies 220 are the same, thereby generating repulsive force between adjacent mass bodies 220. On one hand, it prevents the mass bodies 220 from being piled up and stacked. On the other hand, when the adjacent mass bodies 220 are close, the mass bodies 220 repel each other by the repulsive force, thus the mass bodies 220 move in different directions on the liquid surface of the damping liquid, repel each other, and may roll individually, may automatically arrange to generate gaps, break and cut off the directional flow path on the liquid surface, accelerate the decomposition of the carried vibration kinetic energy, and realize the function of suppressing vibration. Therefore, the multiple mass bodies 220 translate, oscillate, and roll on the surface of the damping liquid, which allows the energy carried by the surface wave to be shattered in 360 degrees along the plane and decomposed in six dimensions of space.

In addition to forming magnetic walls of the same polarity between adjacent mass bodies 220, magnetic walls of the same polarity may also be formed between the mass bodies 220 and the top cover 101 of the housing, being N poles or S poles at the same time. A non-contact repulsive force is formed between magnetic walls of the same polarity, which is inversely proportional to the distance between the mass bodies 220 and the top cover 101, and the damping is inversely proportional to the gap and proportional to the magnetic field strength. The formed damping suppresses the mass body from floating up and down, suppresses the damping fluid from fluctuating up and down, and consumes the energy carried by the fluid fluctuation process. Therefore, it is possible to suppress, eliminate, and dissipate the energy carried by the pitch vibration, lateral vibration, and downwind vibration existing on the upper part or the top of the load-bearing enclosure.

A second magnetic body 225 may be provided on the lower surface of the top cover 101. Optionally, magnets or magnetic materials may be attached to the lower surface of the top cover 101 to make the lower surface of the top cover 101 be magnetic, for example, magnets or magnetic materials may be attached to the lower surface of the top cover 101, or the magnetic materials may be coated or plated. The second magnetic body 225 formed on the lower surface of the top cover 101 has the same polarity with the first magnetic body 224 on the mass body 220. When the mass body 220 is a cuboid, a cube, or a cylinder, a first magnetic body 224 is formed on the side surface of the mass body 220. The second magnetic body 225 has the same polarity with the first magnetic body 224. When the first magnetic body 224 and the second magnetic body 225 face each other, the mass body 220 flexibly collides with the top cover 101 due to the repulsive force between the isotropic magnets, and even prevents the mass body 220 from colliding with the top cover 101 of the housing 100.

Figure 12:
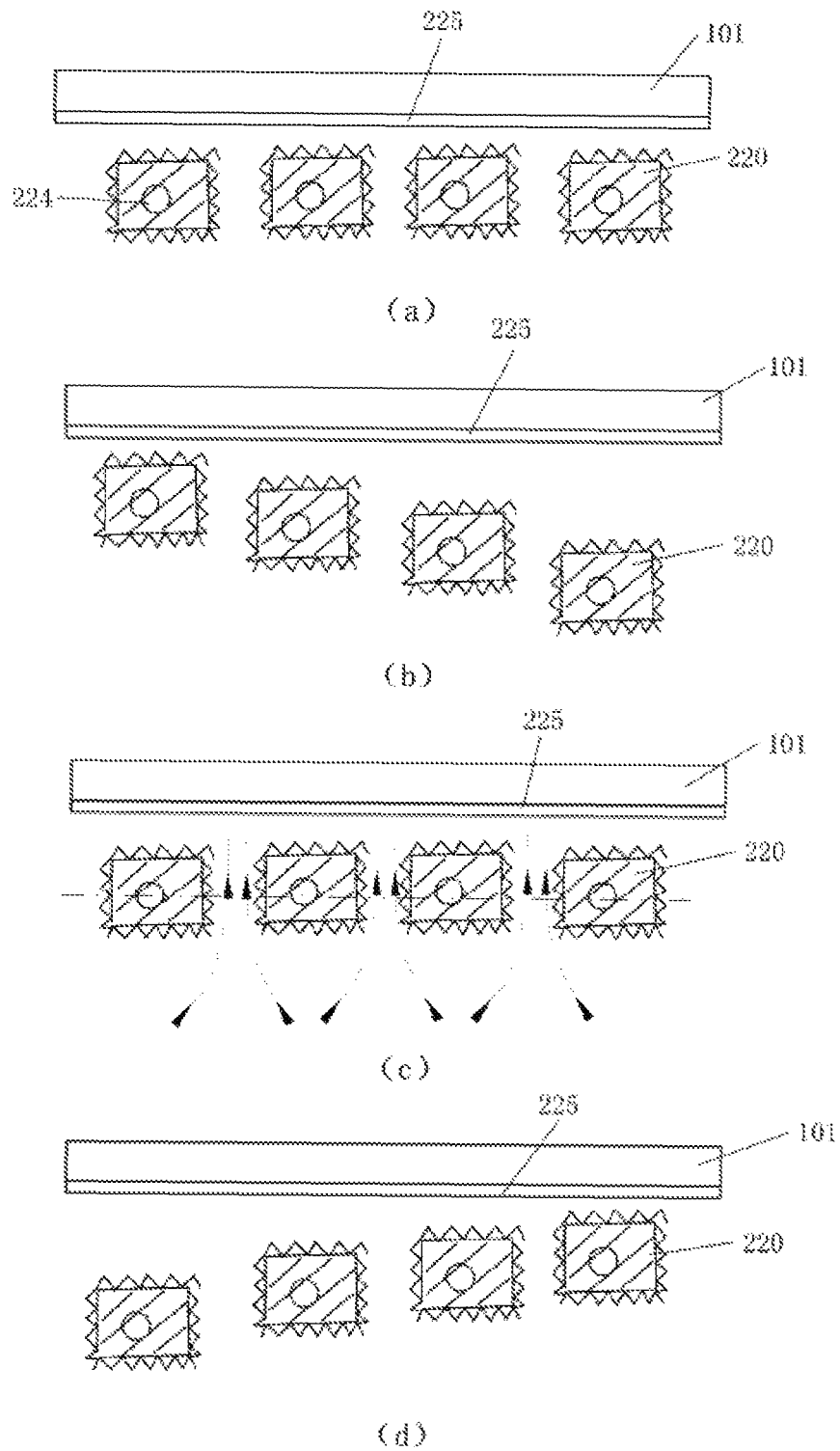
FIG. 12 shows the process that the mass body in the damper according to the third embodiment of the present application oscillates up and down in the damping liquid.

FIG. 12 shows a process in which the mass bodies in a damper according to an embodiment of the present application oscillates up and down in the damping liquid.

According to an embodiment of the present application, since the lower surface of the top cover 101 of the housing and the upper surface of the mass body 220 are set as magnetic walls with the same polarity, the top cover 101 may exert a non-contact repulsive force on the mass body 220 during the oscillation and floating of the mass body 220 in the damping liquid. The repulsive force is inversely proportional to the distance between the mass body 220 and the top cover 101, and the formed damping is inversely proportional to the gap distance and directly proportional to the magnetic field strength. The formed damping suppresses the up and down fluctuation of the wave crushing rake, suppresses the up and down floating of the mass body 220, and consumes the energy carried in the process of the liquid fluctuation.

Similar to the process that waves pass through the gaps between the mass bodies 220 in the horizontal direction, the waves may pass through the gaps between adjacent mass bodies 220 in the upward movement process, and the directionally flowing liquid is cut off, divided and adjusted by the wave crushing rake, so as to be scattered, thus achieving the effect of restraining the mass bodies 220 from fluctuating up and down and rolling over. The ups and downs of waves make the mass body 220 be submerged and floated out of the liquid in the process of floating up and down, and constantly collide with the liquid waves during the movement. When the liquid climbs up or falls down along the gap between the mass bodies 220, it collides with the tooth-shaped protrusions 221 on the mass bodies 220 and is squeezed by two adjacent mass bodies 220. The fluid is impacted, cut and decomposed, which makes the vibration kinetic energy be fragmented, and converts the ordered energy and high-quality energy into disordered and low-quality energy.

Figure 11:
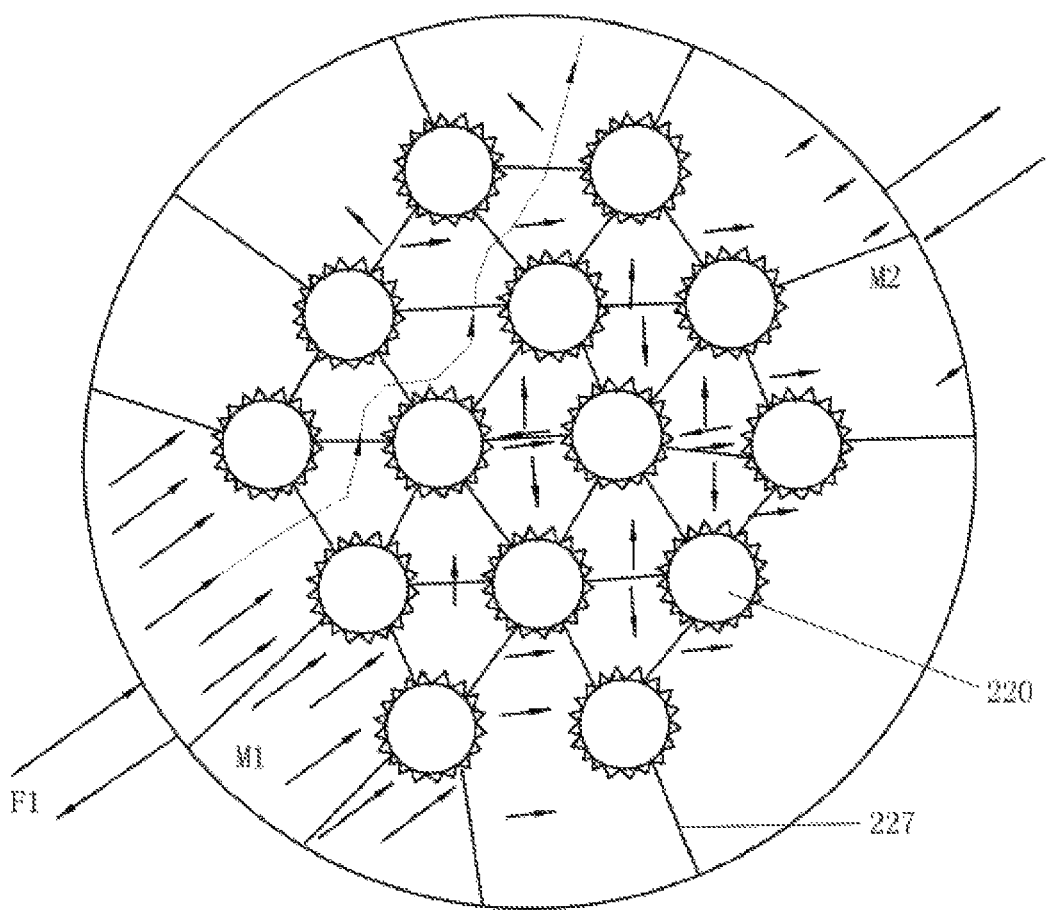
FIG. 11 is a top view of yet another example of a damper according to the third embodiment of the present application, in which a cross section of a mass body is circular and multiple mass bodies are connected to each other by an elastic connecting member.

In addition to providing a magnetic body on the outer surface of each mass body 220, as shown in FIG. 11, an elastic connecting member 227 may be provided between multiple mass bodies 220 to form interconnected rake clusters. The mass bodies 220 and the inner side wall of the damper housing are connected by the elastic connecting member 227 to make multiple mass bodies be disposed on the damping liquid surface in the form of a mesh.

The elastic connecting member 227 allows a gap among the mass bodies all the time. In the schematic diagram, the mass body 220 is connected to the inner wall of the damper using an elastic connecting member 227, thus the rake may not accumulate on the inner wall of the damper, which forms a certain restriction on the movement of the rake clusters. The rake clusters connected and distributed in a net-like manner cover the liquid surface as a whole. Due to the elastic constraints of the solid boundary connecting members or the mutual elastic constraints, the fluctuation process of the liquid surface may not cause the result of fluctuation of the same amplitude as the liquid surface. On the contrary, it can inhibit the fluctuation of the liquid around the mass body 220 and contacting the mass body 220, and can crush the fluctuating liquid and the liquid flowing around the rake. The liquid carries momentum and is scattered after crushing, which reduces the total momentum of liquid vibration, accelerates the dissipation rate of vibration energy, and restrains the vibration in time and prevent expansion. That is, there are two directions of liquid crushing, vertical and horizontal, which forms the three-dimensional dissipation effect.

In a third embodiment according to the present application, the elastic connecting member 227 may be a spring member, or a material capable of storing energy elastically and having self-recovery resilience, such as a rubber band capable of rebounding after stretching.

In the third embodiment according to the present application, the mass body 220 may have many shapes such as cuboid, cube, cylinder, sphere, cone, etc. Tooth-shaped protrusions may be formed on the outer surface of the mass block by casting.

The surface of the non-magnetic rake (that is, the outer surface of the mass body 220 does not have magnetism) and its protrusions may be the metal working surface of the machine tool or stamped by the metal working die of the machine tool. The surface of the magnetic rake (that is, the outer surface of the mass body 220 is magnetic) may be a ferrite permanent magnet molding material, or may be obtained by molding a sintered aluminum iron boron material and then magnetizing it.

The damper according to the embodiment of the present application may be installed in the tower of the wind turbine. Corresponding dampers may be set for the first-order vibration and second-order vibration of the system, and multiple dampers may be arranged in layers along the height direction of the tower tube. The outer wall of the damper may be tightly fixed with the inner wall of the tower.

According to the technical solution of the present application, a protection system is constructed for the load-bearing enclosure of the tower of the wind turbine, which is installed in the inner circumference of the upper section of the tower in advance during the construction of the wind farm, and the energy dissipation capacity is built inside the tower. Structural damping may reduce the damage to the tower foundation, reduce the impact of shaking on the angle of attack and aerodynamic shape formed by the original upwind air flow in the face of the tower, and improve the utilization rate of wind energy. At the same time, the change of the wind direction on site may also be considered, and the damping coefficient of the damper can be adjusted adaptively to solve the damage and hidden danger to the tower foundation connection caused by the wind-induced sloshing of the wind turbine load-bearing structure (tower) itself during the hoisting process, and improve the stability of load-bearing enclosure, thereby improving the safety and hoisting efficiency within limited hoisting time, shortening the construction period of wind farm, avoiding delay of grid-connected power generation of wind turbine due to delay of wind farm construction period, and realizing grid-connected power generation as early as possible, thus avoiding loss of power generation time and power generation.

In addition, by applying the damper according to the embodiment of the application to the wind turbine, pitch vibration and lateral vibration in the operation process can be suppressed, so as to improve the absorption coefficient of the wind turbine for wind energy utilization, improve the wind energy conversion rate and increase the power generation. It can also ensure the stability of the whole structure of the wind turbine during operation and shutdown, inhibit excessive fatigue and damage of the whole machine and components caused by vibration induced by fluid-structure coupling in natural environment during operation and shutdown of the wind turbine, reduce the risk of tower overturning during operation of the wind turbine, and benefit both wind farm investors and builders.

According to the prior art scheme of using spirals to suppress vortex-induced vibration, the coverage of the spirals on the surface of the tower will affect the lateral oscillation suppression effect. When the coverage reaches (or exceeds) 50%, the lateral vibration suppression effect reaches an optimal level. The wind-induced noise of the spiral and the air flow, however, may also increase accordingly, causing serious impacts on the natural environmental organisms, especially causing disturbance to animals and birds, and damage to the ecological environment. According to the technical solution of the present application, by installing the damper inside the tower, no wind-induced noise is generated like the spiral scheme, and even if there is a certain amount of noise in the process of suppressing the vibration, it may be blocked by the tower wall, thus the problem of noise existing in the traditional vibration suppression device and avoiding the impact on the ecological environment is solved.

According to the damper of the embodiment of the application, as it is installed inside the tower, it not only solves the environmental noise problem caused by the vibration suppression device installed outside the tower, but also has the advantages of not affecting the appearance of the tower and not increasing the wind resistance of the tower. In addition, the damper may be dismantled and recycled after the tower is hoisted, and may also be fixed inside the tower to suppress the vibration of the tower during the operation of the wind turbine.

According to the technical solution of the present application, in addition to being applied to the tower of the wind turbine, it can also be applied to various load-bearing enclosures such as column-shaped factory chimneys or cooling towers, reducing the risk of collapse of the load-bearing enclosure caused by resonance due to Karman vortex street.

The above embodiments of the present application are merely exemplary, and the present application is not limited thereto. It should be understood by those skilled in the art that changes may be made to these embodiments without departing from the principles and spirits of this application, wherein the scope of protection of this application is defined in the claims and their equivalents.

The invention claimed is:

1. A damper, comprising:
 a housing in which an accommodating cavity is formed; and
 a vibration energy dissipation unit located in the housing; wherein:
   the accommodating cavity comprises a liquid storage cavity and a mass body moving cavity located on top of the liquid storage cavity;
   the vibration energy dissipation unit comprises a damping liquid and a plurality of mass bodies, with the damping liquid contained in the liquid storage cavity and the plurality of mass bodies located in the mass body moving cavity;
   the plurality of mass bodies float on a liquid surface of the damping liquid; and
   a plurality of tooth-shaped protrusions are formed on an outer surface of each of the plurality of mass bodies.

2. The damper according to claim 1, wherein the plurality of tooth-shaped protrusions on each of the plurality of mass bodies has at least one of the following structural features:
   the plurality of tooth-shaped protrusions are arranged in lines or cross rows;
   the plurality of tooth-shaped protrusions have an identical height or different heights;
   the plurality of tooth-shaped protrusions are provided with criss-cross grooves or slots in communication; or
   each of the plurality of tooth-shaped protrusions has sharp tips or sharp edges.

3. The damper according to claim 1, wherein an outer wall of each of the plurality mass bodies is formed as a magnetic wall, and facing surfaces of each two adjacent mass bodies have the same magnetic polarity.

4. The damper according to claim 3, wherein the housing comprises a top cover, a lower surface of the top cover is formed as a magnetic wall surface, and the lower surface of the top cover and an upper surface of each of the plurality mass bodies have the same magnetic polarity.

5. The damper according to claim 3, wherein a first magnetic body is attached to an outside of each of the plurality mass bodies.

6. The damper according to claim 5, wherein a second magnetic body is attached to a lower surface of the top cover.

7. The damper according to claim 1, wherein each of the plurality mass bodies is of a cube shape, a cuboid shape, a cylinder shape, or a cone shape.

8. The damper according to claim 1, wherein an elastic connecting member is used for connecting the plurality of the mass bodies, and for connecting the plurality of the mass bodies to an inner side wall of the housing, so that a mesh-shaped connection structure is formed.

9. The damper according to claim 8, wherein the elastic connecting member is a spring or a rubber band made of an elastic rubber material.

10. The damper according to claim 1, wherein a plurality of mass body moving sub-cavities are provided, and the plurality of mass body moving sub-cavities and the plurality of mass bodies are separated by a plurality of cavity partitions, and the plurality of cavity partitions are arranged along a height direction of the damper;
   the plurality of mass bodies are respectively located in a corresponding mass body moving sub-cavity, and the plurality of tooth-shaped protrusions are formed on a lower surface of each of the plurality of mass bodies.

11. The damper according to claim 10, wherein the housing is of a cylindrical shape, each of the plurality of mass body moving sub-cavities and each of the plurality of mass bodies are of a fan shape or a fan ring shape, and are evenly arranged along a circumferential direction.

12. The damper according to claim 11, wherein each of the plurality of mass bodies is also formed with a restricted passage orifice that penetrates the mass body and communicates the damping fluid with a space above the mass body.

13. The damper according to claim 12, wherein the restricted passage orifice is a constant cross-section through hole or a variable cross-section through hole, and a tube is inserted into the restricted passage orifice, a lower end opening of the tube inserts into the damping liquid by a predetermined depth, and an upper end opening of the tube is higher than the upper surface of the mass body by a predetermined height.

14. The damper according to claim 10, wherein the damper further comprises a damping coefficient adjusting unit for adjusting a damping coefficient of the damper.

15. The damper according to claim 14, wherein the housing includes an outer cylinder wall, a top wall, and a bottom wall, and the damping coefficient adjusting unit comprises:
- a gas chamber formed at the upper part of the mass body and a stiffness adjustable elastic component located in the gas chamber, in which the stiffness adjustable elastic component is connected between the top wall and the mass body; or
- a sealed gas chamber formed on the upper part of the mass body and a gas pressure regulating unit connected with the gas chamber, in which pressure in the gas chamber is adjusted by the gas pressure regulating unit; or
- a gas chamber formed on the upper part of the mass body, an air bag accommodated in the gas chamber, and a gas pressure regulating unit connected with the air bag, in which pressure in the air bag is adjusted by the gas pressure regulating unit; or
- a first magnetic body disposed on the upper surface of the mass body and a second magnetic body disposed on the lower surface of a top cover of the housing, in which the first magnetic body and the second magnetic body have the same magnetic polarity.

16. The damper according to claim 10, wherein the plurality of mass bodies have an even number of mass bodies and are evenly and symmetrically arranged along the circumferential direction.

17. The damper according to claim 1, wherein the damper further comprises a heater and a heat dissipation mechanism, and the heater is arranged in the liquid storage cavity and the heat dissipation mechanism is arranged on an outer side wall of the housing.

18. A load-bearing enclosure, comprising:
- a plurality of tower sections hoisted in sequence to form a support foundation for a nacelle; and
- a damper installed in the plurality of tower sections of the load-bearing enclosure, the damper comprising:
  - a housing in which an accommodating cavity is formed; and
  - a vibration energy dissipation unit located in the housing; wherein:
  - the accommodating cavity comprises a liquid storage cavity and a mass body moving cavity located on top of the liquid storage cavity;
  - the vibration energy dissipation unit comprises a damping liquid and a plurality of mass bodies, with the damping liquid contained in the liquid storage cavity and the plurality of mass bodies located in the mass body moving cavity; and
  - the plurality of mass bodies float on a liquid surface of the damping liquid, and a plurality of tooth-shaped protrusions are formed on an outer surface of each of the plurality of mass bodies.

19. The load-bearing enclosure according to claim 18, wherein the load-bearing structure is of a cylindrical shape, and the damper is installed on an inner wall of the cylindrical structure.

20. The load-bearing enclosure according to claim 19, wherein the load-bearing enclosure is a tower, a television tower, a communication tower, a cooling tower, a factory chimney, or a bridge pillar of a wind turbine, and a plurality of dampers are arranged spaced apart along a height direction of the load-bearing enclosure.

* * * * *